United States Patent
Ransom

(10) Patent No.: US 6,848,464 B2
(45) Date of Patent: Feb. 1, 2005

(54) LINED PIPE ANNULAR VENTING DEVICE

(75) Inventor: Alan Ransom, Aberdeenshire (GB)

(73) Assignees: Coflexip SA (FR); Coflexip Stena Offshore Limited (GB)

( * ) Notice: Subject to any disclaimer, the term of this patent is extended or adjusted under 35 U.S.C. 154(b) by 234 days.

(21) Appl. No.: 10/296,022

(22) PCT Filed: Jun. 1, 2001

(86) PCT No.: PCT/GB01/02435

§ 371 (c)(1),
(2), (4) Date: Nov. 20, 2002

(87) PCT Pub. No.: WO01/94820

PCT Pub. Date: Dec. 13, 2001

(65) Prior Publication Data

US 2003/0159733 A1 Aug. 28, 2003

(51) Int. Cl.$^7$ .......................... F16K 24/04; F16L 55/00; F16L 55/07
(52) U.S. Cl. .................. 137/312; 73/40.5 R; 73/46; 73/49.1; 137/238; 137/244; 137/375; 138/103; 138/109; 138/114; 285/14; 285/55; 285/123.1
(58) Field of Search ................. 73/40.5 R, 46, 73/49.1; 156/286, 287, 294; 137/238, 240, 242, 244, 312, 375; 138/97, 103, 109, 113, 114, 177, 178; 264/36.16, 36.17, 40.1, 265, 269, 516; 285/14, 55, 123.1, 363

(56) References Cited

U.S. PATENT DOCUMENTS

| | | | | |
|---|---|---|---|---|
| 3,301,277 A | * | 1/1967 | Kelly | 138/114 |
| 3,735,475 A | | 5/1973 | Marriott | |
| 4,496,499 A | * | 1/1985 | Brittain et al. | 264/36.17 |
| 4,691,740 A | | 9/1987 | Svetlik et al. | |
| 4,863,365 A | | 9/1989 | Ledoux et al. | 425/343 |
| 4,986,951 A | | 1/1991 | Ledoux et al. | 264/516 |
| 5,149,142 A | * | 9/1992 | Walko et al. | 285/14 |
| 5,277,455 A | * | 1/1994 | Graves et al. | 285/55 |
| 5,306,449 A | * | 4/1994 | Brittain et al. | 264/36.17 |
| 5,395,472 A | * | 3/1995 | Mandich | 156/287 |
| 5,743,299 A | * | 4/1998 | Chick et al. | 138/98 |
| 5,778,938 A | * | 7/1998 | Chick et al. | 138/98 |
| 5,884,657 A | * | 3/1999 | Srock | 137/312 |
| 6,029,505 A | * | 2/2000 | Webb | 73/40.5 R |
| 6,123,110 A | * | 9/2000 | Smith et al. | 138/98 |

FOREIGN PATENT DOCUMENTS

| | | |
|---|---|---|
| EP | 0361951 | 4/1990 |
| EP | 0943417 | 9/1999 |
| GB | 1580438 | 12/1980 |
| WO | 00/08368 | 2/2000 |

* cited by examiner

*Primary Examiner*—George L. Walton
(74) *Attorney, Agent, or Firm*—Ostrolenk, Faber, Gerb & Soffen, LLP

(57) ABSTRACT

A fluid vent (26) for venting fluid from the annulus between the inner surface of a rigid conduit (20) and the outer surface of a conduit liner (10). The fluid vent (26) consists of a length of rigid conduit (34) containing a multiplicity of apertures (32) extending through the wall of the conduit and arranged in an annular pattern around the circumference of conduit (34). The fluid vent (26) further comprises means defining a closed annular volume (36) extending around the exterior circumference of the conduit (34) and interconnecting the outer ends of the apertures (32) with at least one fluid outlet passage (40) located on the exterior of the conduit (34) and communicating with said annular volume (36). The fluid vent can be used to expel water or other liquids from the annular space when retro-fitting a liner to a conduit, venting gas which has permeated through the lining into the annulus, or for assisting in the movement of fluid through the annulus.

7 Claims, 2 Drawing Sheets

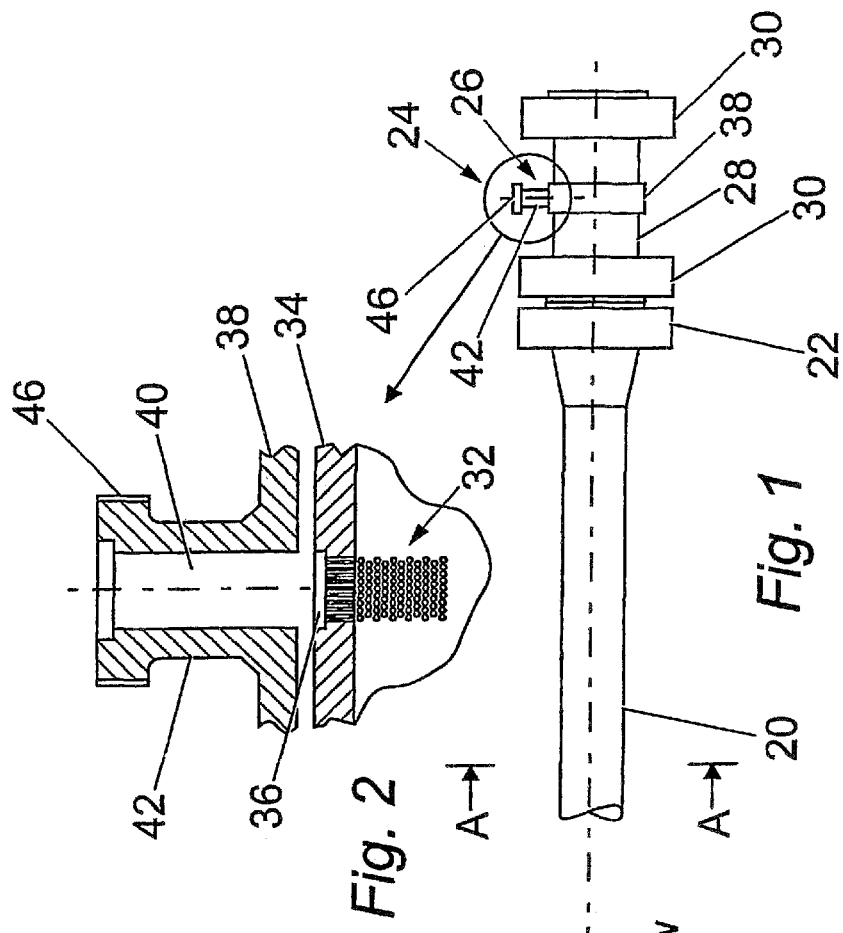
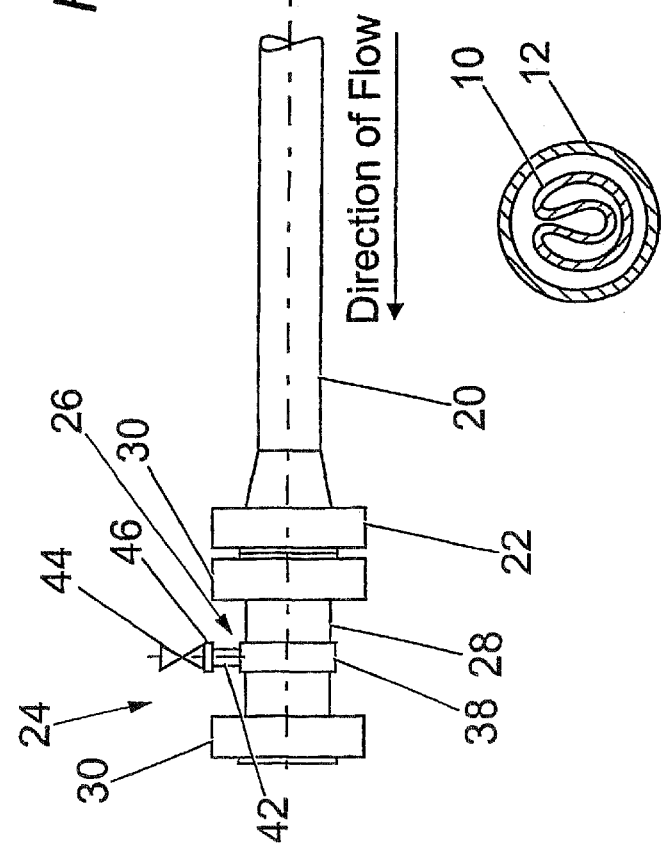

LINED PIPE ANNULAR VENTING DEVICE

The present invention relates to devices and methods for venting fluids from the annulus between a rigid pipeline and a liner inside the pipeline. The invention is particularly applicable to subsea pipelines and may be used for expelling water from the annulus when a liner is retro-fitted to an existing submerged pipeline and/or for venting fluids (especially gases) which permeate from fluid in the pipeline through the liner and into the annulus in use of the pipeline.

It is well known to line pipelines such as rigid steel pipelines with close fitting plastic lining sleeves ("liners"); e.g. for protecting the interior surface of the pipeline against corrosion by fluids flowing through the pipeline. In certain cases it is necessary to provide some means for venting fluids from the small annular space between the liner and the pipeline to the exterior of the pipeline. This is because fluids conveyed in the pipeline are often polyphasic, that is, they have liquid phase components and gas phase components such as Carbon Dioxide and Hydrogen Sulphide. For example, the plastic materials (typically HDPE) from which the liners are formed are gas permeable so that in use of the lined pipeline, gases may permeate from product flowing in the pipeline, through the liner and into the annulus. The collection of gas in the annulus causes a variety of problems, in extreme cases leading to collapse of the liner if the pressure inside the liner is reduced for any reason.

A problem associated with venting arrangements providing a fluid path between the annulus and the exterior of the pipeline is that high pressure within the liner may cause the liner material to deform or extrude into an aperture formed in the wall of the pipeline, which can result in puncturing or rupturing of the liner or blocking of vent apertures so as to prevent proper venting of gases. Examples of arrangements for venting gases from lined pipes are disclosed in U.S. Pat. No. 4,691,740, in which apertures are formed in a small area of the pipeline wall and a gas permeable support member is located inside the pipeline wall adjacent the apertures to prevent the liner cold-flowing into the apertures. WO-A-00/08368 discloses further examples, in which an aperture is formed in the pipeline wall and an assembly including a porous plug and a one way valve is installed in the aperture.

These arrangements provide a very limited flow rate through the vent and are suitable only for venting relatively small volumes of gases which permeate through the liner over an extended period of time.

Referring to FIG. 3 of the accompanying drawings, one method of installing a liner 12 inside a pipeline 10 is to deform the cylindrical liner 10 into a U-shape, which can pass freely through the interior of the pipeline 10, draw the deformed liner 12 through the pipeline and then pressurise the interior of the liner so that it reverts to its original cylindrical shape fitting closely against the inside of the pipeline. For subsea lined pipelines, the liner is normally installed in the pipeline prior to the pipeline being laid on the seabed. Examples of U-shaped liner installation methods are disclosed in GB-A-1580438, U.S. Pat. Nos. 4,863,365, 4,986,951 and EP-A-0943417.

It would be desirable to be able to retro-fit a liner to an existing, submerged pipeline. In this case, the pipeline would be flooded with water prior to installing the deformed U-shaped liner. When the liner is subsequently pressurised, the water contained in the pipeline would have to be expelled from the annulus between the liner and the pipeline. Gas-venting systems such as those disclosed in U.S. Pat. No. 4,691,740 and WO-A-00/08368 are unsuitable for venting relatively large volumes of liquid in a reasonable time.

The present invention concerns arrangements for venting fluids from the annulus of a lined pipeline at a relatively high rate of flow, enabling water to be expelled from the annulus when a liner is fitted to an existing subsea pipeline. The same venting arrangements may also be employed for other purposes such as venting gases which permeate through the liner in use of the pipeline.

In accordance with the invention, there is provided fluid vent apparatus for venting fluid from an annulus between a rigid conduit and a liner extending along the interior of said conduit, said apparatus comprising a length of rigid conduit including a conduit wall and having a multiplicity of apertures extending through said wall and arranged in an annular pattern extending around the circumference of said conduit, said apparatus further comprising means defining a closed annular volume extending around the exterior circumference of said conduit and interconnecting the outer ends of said apertures, and at least one fluid outlet passage located on the exterior of said conduit and communicating with said annular volume.

Preferably, said annular volume is closed by a ring member extending around the exterior surface of said conduit and secured thereto on either side of said annular volume.

Preferably, said annular volume is defined by a groove formed around the exterior surface of said conduit.

Preferably, the dimensions of said apertures are selected to prevent the material of a liner of predetermined parameters from extruding into said apertures under predetermined pressure and temperature conditions.

Preferably, the number of said apertures and the dimensions of said fluid outlet passage and said annular volume are selected to allow a predetermined flow rate from the interior of said conduit to the exterior thereof via said fluid outlet passage.

Most preferably, the fluid vent apparatus comprises a pipe connector device having first and second connector means located at either end of said conduit.

Embodiments of the invention will now be described, by way of example only, with reference to the accompanying drawings in which:

FIG. 1 is a side view of a pipeline fitted with fluid venting devices in accordance with one embodiment of the present invention;

FIG. 2 is an enlarged, sectional side view of part of one of the fluid venting devices of FIG. 1;

FIG. 3 is a cross sectional view of a pipeline illustrating a known U-shaped liner installation method.

Figure 4:
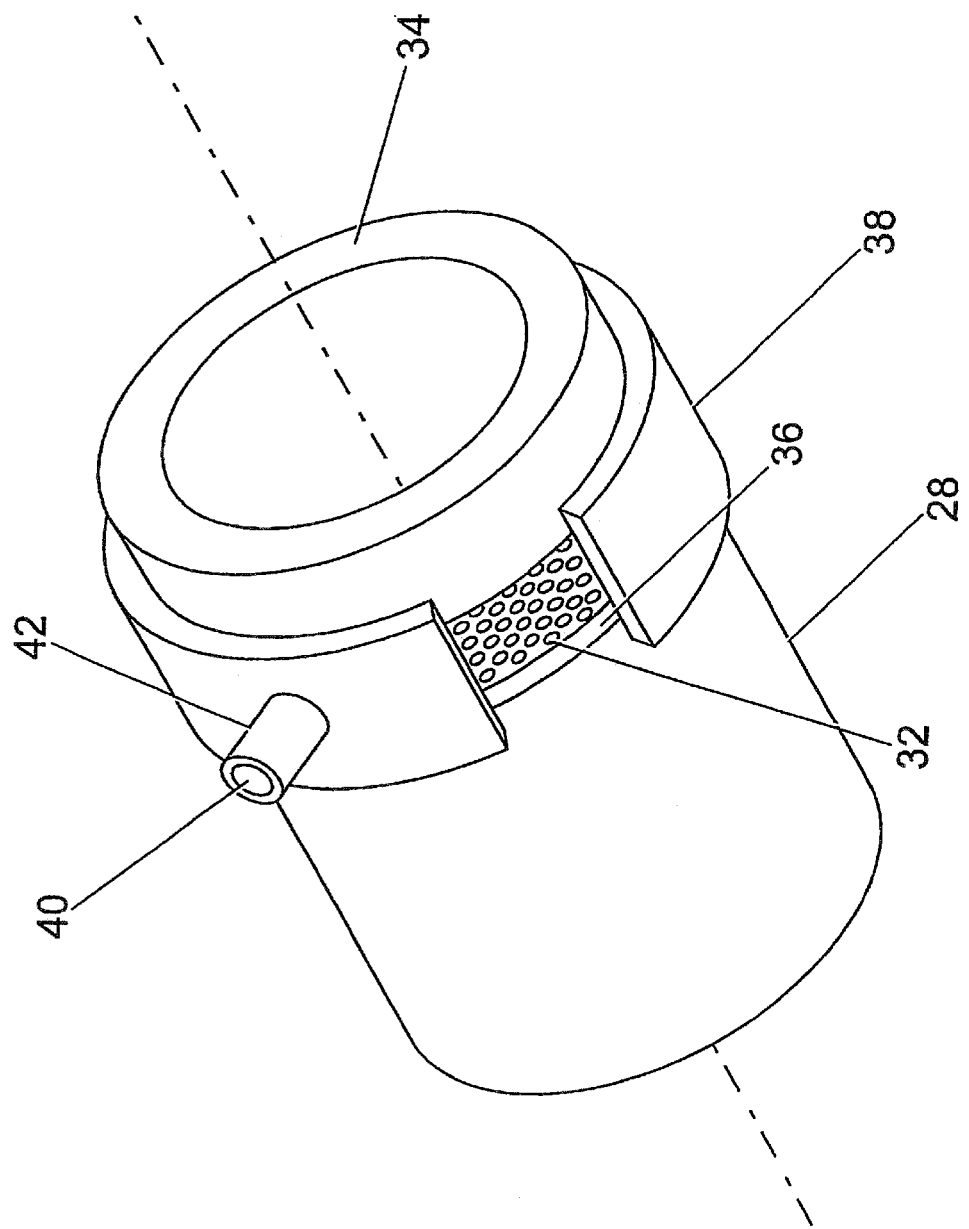
FIG. 4 is a perspective view of a fluid venting device as illustrated in FIGS. 1 and 2.

Referring now to the drawings, FIG. 1 shows a length of rigid pipeline 20 having a conventional flange connection 22 at either end. Connected to each of the flange connections 22 is a flanged pipe connector device 24 incorporating a fluid vent 26 in accordance with the present invention. Each of the connector devices 24 comprises a length of conduit 28 having a flange connection 30 at each end thereof, the fluid vent 26 being located in the middle of the conduit 28.

The fluid vent 26 comprises a multiplicity of apertures 32 formed in the conduit wall 34 and arranged in an annular pattern extending around the circumference of the conduit 28. An annular groove 36 is formed in the exterior surface of the conduit wall 34, defining an annular volume interconnecting the outer ends of the apertures 32. The annular volume defined by the groove 36 is closed by an outer ring member 38 surrounding the conduit 28 and welded thereto on either side of the groove 36. FIG. 2 shows the ring 38 spaced from the outer surface of the conduit 28 for clarity of illustration. FIG. 4 illustrates the arrangement more clearly, with part of the ring 38 removed to show the apertures 32 and groove 36. A fluid outlet passage 40 is formed through the ring 38 and a spigot 42 connected to the outer surface thereof. A one-way vent valve 44 may be connected to the outer end of the spigot 42, by means of any suitable type of connector 46 formed at the end of the spigot 42. A plug may also be used to relieve pressure in the annulus. The fluid outlet passage 40 communicates with the annular volume defined by the groove 36 and, via the apertures 32, with the interior of the conduit 34. Accordingly, fluid contained between the inner surface of the conduit 28 and a liner inside the conduit may be expelled or vented via the apertures 32 and fluid outlet passage 40.

In this embodiment, the apertures 32 comprise an annular array of small diameter circular holes. The diameter of the holes is selected to be sufficiently small as to prevent the material of the liner being deformed into or extruded through the apertures 32 by elevated pressure inside the liner, having regard to the properties of the liner material, the liner thickness, and the expected operating temperatures and pressures. For typical subsea applications involving the use of liners of relatively soft HDPE material having a thickness of about 10 mm and working pressures up to about 450 bar, the apertures 32 may suitably have a maximum diameter of the order of 3 mm. This allows a relatively high safety factor of about 4, in view of the fact that HDPE exhibits long term tensile creep at elevated temperatures.

The cross sectional area of the fluid outlet passage 40 is selected to allow flow rates up to a predetermined value sufficient to allow the relevant volume of fluid to be expelled in a reasonable time period. The necessary flow rate may be determined by the inner diameter of the pipe and the length of the pipe between vents (i.e. by the total volume of fluid to be expelled through the vents) and by the desired time period within which the fluid is to be expelled. For the purposes of expelling water during retro-fitting of a liner to a pipeline of the order of 2–3 km in length with an inner diameter of 10–16 inches (25.4–40.6 cm), the fluid outlet passage might suitably have a diameter of the order of 25–40 mm. The corresponding total cross-sectional area which needs to be provided by the multiple small apertures 32 for a given flow rate may be determined in a similar manner, and hence the required number of apertures 32 of a given size may be calculated. Generally speaking, the total area of the small apertures 32 should be at least about equal to the area of the fluid passage 40. For example, if the fluid passage has a diameter of 40 mm and the apertures have a diameter of 3 mm, approximately 180 small apertures would be required. The cross sectional area of the annular volume defined by the groove 36 may also be determined on the basis of the required flow rate, corresponding generally to the cross sectional area of the fluid outlet passage 40.

More than one fluid outlet passage 40 may be provided around the circumference of the ring 38, in which case the diameter of the individual outlet passages may be reduced for a given total flow rate, as may the cross sectional area of the annular volume defined by the groove 36.

The apertures 32 may be formed by any suitable means including drilling, laser cutting and electrical spark erosion. The apertures 32 need not be circular. For example, they could be formed as slots or the like, provided that the dimensions of the apertures are sufficiently small to prevent deformation/extrusion of the liner material.

It will be understood that forming the apertures 32 and groove 36 in the wall of the conduit 28 necessarily reduces the strength of the conduit, lowering its resistance to collapse and bursting. However, this is compensated for by the ring member 38, which effectively reinforces the weakened portion of the conduit 28.

The construction of the vent assembly may also vary from that of the present embodiment, in which the apertures 32 and the annular volume interconnecting the apertures 32 are formed in the wall of the conduit 28. The apertures 32 may be formed in a separate annular member located inside the conduit or connected between two lengths of conduit. The annular volume may be formed in the outer ring rather than in the conduit or other member containing the apertures 32, or in a combination thereof. Alternatively, the main body of the device 24 could be formed from two standard tapered flange connectors welded back to back with the outer ring extending around the union between the two connectors so that a shallow V-section annular volume is defined between the ring and the outer tapered surfaces of the joined connectors. Other possible arrangements may be envisaged, provided that the assembly provides a multiplicity of small apertures, an outer volume interconnecting the apertures and at least one fluid outlet communicating with the outer volume.

It will be appreciated that a vent arrangement of this type may be incorporated into any length of pipeline. However, it is preferred that the arrangement is incorporated into a connector device which may be connected to the end of a length of pipeline or between adjacent lengths of pipeline, particularly for the purpose of retro-fitting a liner to an existing subsea pipeline. It will further be appreciated that such a device may employ end connectors of types other than flange connections.

In use of the invention for the purpose of installing a liner in a subsea pipeline, one of the devices 24 is fitted to each end of the length of pipeline which is to be lined. The U-shaped liner is pulled through the pipeline from one end thereof, trimmed to length and its ends secured and sealed to the outer ends of the devices 24 by any suitable means (as known in the art). During this process, a large volume of water is trapped between the liner and the inner diameter of the pipeline. The interior of the liner is then pressurised so as to expand and revert to its circular shape to fit the inner diameter of the pipeline, the water trapped in the annulus being expelled through the vents 26. The arrangement of the vents allows a relatively high flow rate therethrough, so that the process may be carried out economically. Pockets of water may remain trapped between the liner and the pipe after the liner has been pressurised. If necessary, such pockets may be expelled by running a pig along the interior of the liner so as to push any trapped water to one end of the pipe, where it may be expelled through the vent 24 located downstream of the pig. Vent valves 44 may subsequently be fitted to the vents 24 for in-service venting of permeating gases.

For the purpose of venting permeated gases, the provision of the annular array of apertures 32 and the annular volume defined by the groove 36 means that the fluid outlet passage 40 does not have to be accurately aligned at any particular point on the circumference of the pipe. Gases collected at the fluid outlet passage 40 can be vented to the surface or to a subsea atmospheric pressure canister (not shown) which can be attached to the fluid outlet passage 40.

In order to facilitate the passage of permeated gases to the vent port, it may be desirable for the outer surface of the liner to be provided with grooves which act as channels communicating with the vent port. Such liner grooves improve the circulation and thermal transfer of fluids within the annulus and can be used to control and measure the flow of fluids around the annulus. The annular array of apertures makes it easier for a number of such grooves to communicate with the vent port. In addition, the annular groove 36 can be modified by the addition of bulkheads to partition the annular groove. The partitions allow the liner grooves to be linked together thereby creating fluid flow across the annular groove 36.

The invention thus provides an improved fluid vent for a lined pipe which makes possible the retro-fitting of liners to subsea pipelines by allowing excess pressure trapped in the annulus to be vented harmlessly, removing any long term risk of liner collapse due to either flow induced collapse or trapped gas build up from transported fluids.

Improvements and modifications may be incorporated without departing from the scope of the invention.

What is claimed is:

1. Fluid vent apparatus for venting fluid from an annulus between a rigid conduit and a liner extending along the interior of said conduit, said apparatus comprising a length of rigid conduit including a conduit wall and having a multiplicity of apertures extending through said wall and arranged in an annular pattern extending around the circumference of said conduit, said apparatus further comprising means defining a closed annular volume extending around the exterior circumference of said conduit and interconnecting the outer ends of said apertures, and at least one fluid outlet passage located on the exterior of said conduit and communicating with said annular volume.

2. Fluid vent apparatus as claimed in claim 1, wherein said annular volume is closed by a ring member extending around the exterior surface of said conduit and secured thereto on either side of said annular volume.

3. Fluid vent apparatus as claimed in claim 2, wherein said annular volume is defined by a groove formed around the exterior surface of said conduit.

4. Fluid vent apparatus as claimed in claim 1, wherein said annular volume is defined by a groove formed around the exterior surface of said conduit.

5. Fluid vent apparatus as claimed in claim 1, wherein the dimensions of said apertures are selected to prevent the material of a liner of predetermined parameters from extruding into said apertures under predetermined temperature and pressure conditions.

6. Fluid vent apparatus as claimed in claim 1, wherein the number and dimensions of said apertures and the dimensions of said fluid outlet passage and said annular volume are selected to allow a predetermined flow rate from the interior of said conduit to the exterior thereof via said fluid outlet passage.

7. Fluid vent apparatus as claimed in claim 1, comprising a pipe connector device having first and second connector means located at either end of said conduit.

* * * * *